United States Patent Office 3,481,284
Patented Dec. 2, 1969

3,481,284
METHOD AND MACHINE FOR PRODUCING KATAIFI
Constantine John Cambanis, 646 Fredericka St., Rietfantein, Pretoria, Transvaal, Republic of South Africa
Filed Nov. 2, 1967, Ser. No. 680,108
Int. Cl. A21c 5/00
U.S. Cl. 107—4   9 Claims

ABSTRACT OF THE DISCLOSURE

A method and apparatus for producing the confection known as kataifi whereby a mixture of a flour and water, with or without sweetening or flavoring substances, is caused to be fed in thin streams onto the heated surface of a rotatably mounted drum-like hot plate at its highest point, and removed in cooked form from such hot plate at a lower elevation by scraping and deflecting means arranged to be pressed in contact with the surface of such hot plate.

---

This invention relates to a method and apparatus for the continuous manufacture of a confection made from a mixture of a flour and water, with or without added sweetening or flavoring substances, which is known under the Greek name of kataifi. Previously this confection has been made in small batches by hand, and one of the objects of the present invention is to provide a machine by means of which it can be produced substantially continuously and in large quantities.

According to the invention a method of producing the confection known as kataifi, consists in providing a moving heated plate, disposing a mixture container above the plate for containing the mixture which is of substanitally creamy consistency, which mixture container is provided with a series of small outlet jet openings through which the mixture is capable of flowing by way of thin streams onto the heated plate whereby it is rapidly cooked, and providing suitable means for continuously removing such cooked confection as by scraping it from the heated plate onto or into convenient collecting means.

The heated plate which effects the cooking operation after the manner of the well known griddle plate, is preferably circular in shape and arranged to rotate beneath the mixture container for the confectionary mixture. Means are provided for heating such plate so that when it passes beneath the mixture container, it is at the right temperature to effect cooking of the mixture almost instantaneously.

The heated plate may be a flat circular disc or annulus arranged to rotate about a vertical axis. Preferably however, the heated plate is in the form of a metal band bent or constructed to circular form to provide a drum-like structure, which is connected by spokes to a boss and is arranged to be driven at a predetermined speed, about a horizontal axis, and is provided inside with means for heating the metal band at an appropriate region and to a predetermined temperature.

In this preferred form of the machine according to the invention, this heated band forming the periphery of a wheel, is mounted for rotation about a horizontal axis with the container for the flour and water mixture of creamlike consistency, mounted directly above the top side of the heated plate, while removal of the cooked confection is arranged to take place from a side region of the band by means of a scraping device which deflects it onto a receiving platform or other convenient collecting means.

The heating means may be a series of gas jets or heating may be effected by a plurality of electrical heating elements arranged around a similar drum-like structure located within the outer heated band plate structure, and arranged close to the inside surface thereof. This inner drum-like structure supporting the heating means, remains stationary while the outer heated band member rotates round it, driven conveniently by a belt and pulley drive taken from suitable power supply means such as an electric motor.

To clean the surface of the outer heated band after the cooked confection has been removed from it, it is arranged to rotate in contact with a brush, and beyond such brush a roller is provided to make contact with the surface thereof so as to apply to it a releasing composition such as fat or a suitable cooking oil.

To enable the invention to be more clearly understood and carried into practice, reference is now made to the accompanying drawings in which.

Figure 1:
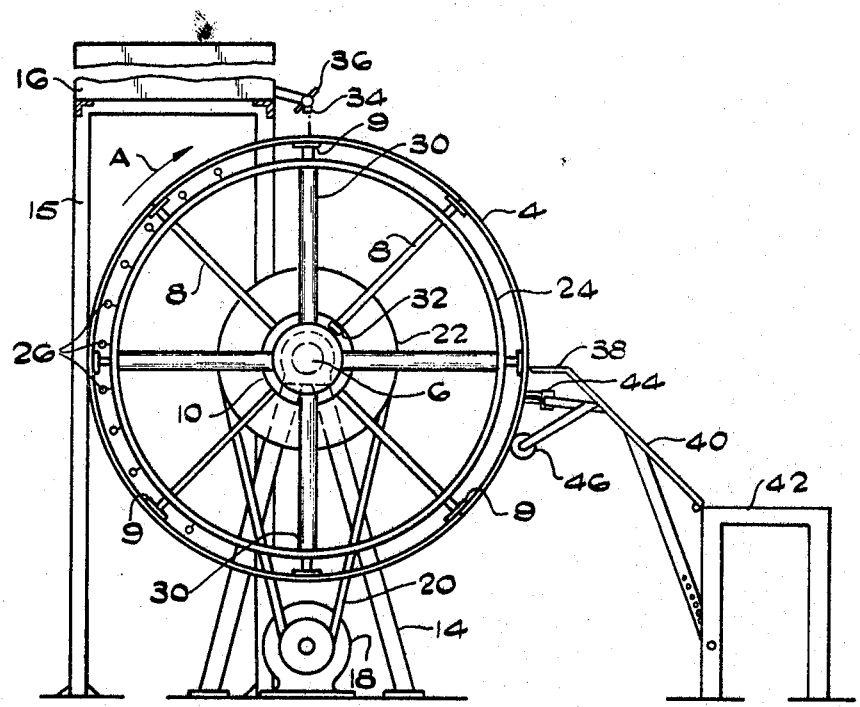
FIGURE 1 is a partly diagrammatic side elevation of a continuous confection manufacturing machine, made according to the invention.
Figure 2:
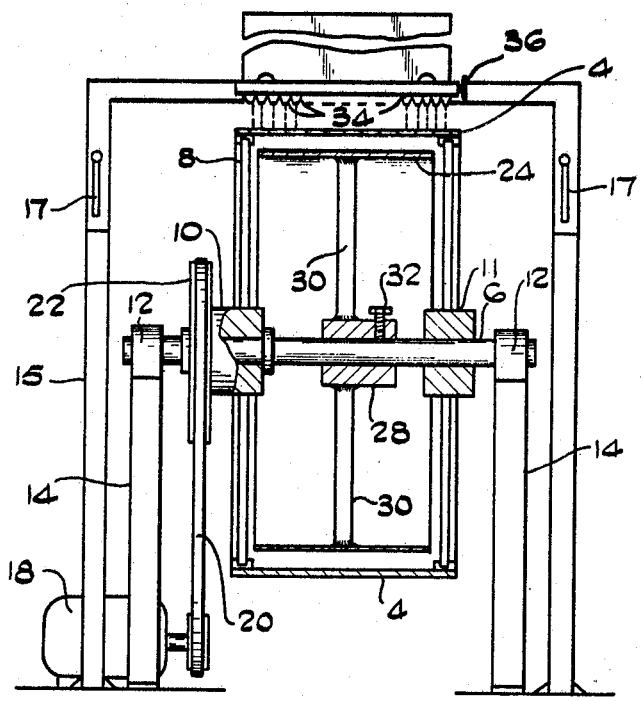
FIGURE 2 is a part-sectional vertical end view of the machine of FIGURE 1.

Referring to the drawings, reference 4 denotes the heated circular band forming the periphery of the drum-like structure rotatably mounted on a fixed shaft 6 by means of the spokes 8 and bosses 10 and 11. The shaft 6 is supported in brackets 12 fixed to the tops of supporting frames 14. A separate frame 15 supports the container 16 for the confection mixture, which frame 15 is movable and adjustable for height.

The drum-like structure comprising the heated circular band 4 is arranged to be rotated in the direction of the arrow A, by the electric motor 18, belt 20 and pulley 22 fixed to the outer end of the boss 10.

Also supported on the shaft 6 is the inner drum-like structure having a peripheral band 24 on which heating electrical elements or gas jets 26 are mounted so that the heat therefrom is directed to the outer band 4. The electrical heating elements or gas jets, shown in FIGURE 1 as gas jets 26 only a portion of which are depicted, extend around the entire periphery of band 24. This inner drum-like structure is connected by spokes 30 to a boss 28 which is removably fixable to the shaft 6 by a set-screw 32.

The mixture container 16 is provided with a row of jet outlets 34 through which the mixture flows in fine streams onto the heated band 4. Shut-off valve means 36 are provided to close off the supply when desired.

To remove the cooked confection from the band 4, a transverse scraper blade 38 is positioned as shown in FIGURE 1, so as to remove the cooked confection and direct it by way of the hinged adjustable sloping guide plate 40 onto a collecting platform or table 42. Located beyond the scraper blade 38 in the direction of rotation of the band 4, is the brush 44 for cleaning the surface of the band 4, and beyond that a roller 46 for applying a cooking oil or the equivalent to the cleaned surface so as to reduce sticking of the cooked confection thereto.

The band 4 which may be of brass or copper plate is preferably made up of several sections bolted at their ends to the spokes 8 which have holed lugs 9 to receive them. The frame 15 is adjustable for height by making it in two parts joined by a slotted arrangement 17.

The electrical heating elements 26 or gas jets may be connected in two or more sets with switching means being provided to enable one or more of such sets to be switched on and off as required. Electrical heating elements 26 may be connected via slip rings on the shaft 16, and via switches to electric mains. If gas jets are used as heating means, they may be connected to a gas supply via a ring which is rotatable on the shaft 16 and which defines an annular chamber in association therewith. Valves may be provided for controlling gas flow to the gas jets.

What is claimed is:

1. A method for the continuous manufacture of a fluid confection made from a mixture of flour and water, with or without added sweetening or flavoring substances, which is known under the Greek name of kataifi, which consists in providing a moving heated plate comprising a metal band bent, or constructed to circular form to provide a drum-like structure which is connected by spokes to a boss and is arranged to be driven at a predetermined speed about a horizontal axis, and is provided inside with means for heating the metal band at an appropriate region and to a predetermined temperature, disposing a container above the heated plate for containing the mixture which is of substantially flowable creamy consistency, which mixture container is provided with a series of small outlet jet openings above the heated plate through which openings the mixture is capable of flowing under gravitational action by way of thin streams onto the heated plate whereby it is rapidly cooked, and providing suitable means for continuously removing the cooked confection as by scraping it from the heated plate onto or into convenient collecting means.

2. A machine for the continuous manufacture of a confection which comprises a heated plate in the form of a metal band bent or constructed to circular form to provide a drum-like structure which is connected by spokes to a boss and is arranged to be driven at a predetermined speed about a horizontal axis and is provided inside with means for heating such metal band at an appropriate region and to a predetermined temperature, a container for the confection mixture of flowable cream-like consistency, located above the drum-like structure and having a series of small outlet jet openings also located above the drum-like structure through which openings the said mixture is capable of flowing under gravitational action by way of thin streams onto the rotating heated band, and means positioned on one side of the drum-like structure for removing the cooked confection from the heated band onto or into collecting means.

3. A machine for the continuous manufacture of a confection as claimed in claim 2, wherein the heating means for the band of the drum-like structure is arranged around a similar inner drum-like structure located within the first-mentioned or outer drum-like structure and arranged close to the inside surface of the heated band thereof.

4. A machine for the continuous manufacture of a confection as claimed in claim 3, wherein the inner drum-like structure supporting the heating means, remains stationary while the outer drum-like structure incorporating the heated band rotates round it, driven through power transmitting devices by any suitable driving means such as an electric motor.

5. A machine for the continuous manufacture of a confection as claimed in claim 4, wherein to clean the surface of the heated band of the outer drum-like structure after the cooked confection has been removed, it is arranged to rotate in contact with a brush, and beyond such brush a roller is provided to make contact with the heated band after brushing and to apply to it a releasing composition such as a fat or a suitable cooking oil.

6. A machine for the continuous manufacture of a confection as claimed in claim 3, wherein both inner and outer drum-like structures are mounted on a common fixed horizontally supported shaft with the inner drum-structure located in spaced relationship within the heated band of the outer drum-like structure and fixable to the shaft, while the outer drum-like structure is rotatably mounted on said shaft.

7. A machine for the continuous manufacture of a confection as claimed in claim 6, wherein the means for removing the cooked confection from the heated band of the outer drum-like structure, comprises a scraper blade arranged to be pressed into scraping contact with the rotating heated band so as thereby to deflect the cooked confection on to a collecting platform located below such scraper blade and suitably supported at a convenient working height.

8. A machine for the continuous manufacture of a confection as claimed in claim 6, wherein the inner drum-like structure is removably fixable around the shaft so as thereby to be removable from the outer drum-like structure.

9. A machine for the continuous manufacture of a confection as claimed in claim 8, in which the container is adjustable in height above the heated plate.

References Cited

UNITED STATES PATENTS

| | | | |
|---|---|---|---|
| 963,942 | 7/1910 | Richardson | 34—110 |
| 1,118,182 | 11/1914 | Brandell. | |
| 1,399,149 | 12/1921 | Nuubson | 107—60 |
| 1,744,497 | 1/1930 | Paterson et al. | 107—58 |
| 2,106,633 | 1/1938 | Girodin. | |
| 2,571,426 | 10/1951 | Doniak | 34—110 X |
| 3,267,877 | 8/1966 | Thiele et al. | 107—57 |

WALTER A. SCHEEL, Primary Examiner
ROBERT I. SMITH, Assistant Examiner

U.S. Cl. X.R.
107—54